US011637480B2

(12) United States Patent
Kliemke et al.

(10) Patent No.: US 11,637,480 B2
(45) Date of Patent: Apr. 25, 2023

(54) POWER PLANT HAVING A COOLING SYSTEM, METHOD FOR OPERATING SUCH A POWER PLANT, METHOD FOR MODIFYING A POWER PLANT

(71) Applicant: Siemens Energy Global GmbH & Co. KG, Munich (DE)

(72) Inventors: Hardy Kliemke, Seodaemun-Gu (KR); Thomas Johnke, Berlin (DE); Robert von Blumenthal, Fürth (DE); Ralf Liebig, Bergfelde (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 204 days.

(21) Appl. No.: 16/764,991

(22) PCT Filed: Oct. 15, 2018

(86) PCT No.: PCT/EP2018/078021
§ 371 (c)(1),
(2) Date: May 18, 2020

(87) PCT Pub. No.: WO2019/101440
PCT Pub. Date: May 31, 2019

(65) Prior Publication Data
US 2020/0321831 A1    Oct. 8, 2020

(30) Foreign Application Priority Data
Nov. 23, 2017    (DE) ............... 10 2017 220 977.1

(51) Int. Cl.
*H02K 9/19*    (2006.01)
(52) U.S. Cl.
CPC .................... *H02K 9/19* (2013.01)

(58) Field of Classification Search
CPC . F02C 6/18; F01K 23/10; F01K 17/02; F01K 13/02; F01K 9/003
See application file for complete search history.

(56) References Cited

U.S. PATENT DOCUMENTS 5,431,835 A * 7/1995 Katafuchi .......... C10M 169/041
508/579
2005/0172651 A1   8/2005 Drubel et al.
(Continued)

FOREIGN PATENT DOCUMENTS

DE    102008006259 A1    7/2008
DE    102012206296 A1   10/2013
(Continued)

OTHER PUBLICATIONS

PCT International Search Report and Written Opinion of International Searching Authority dated Jan. 21, 2019 corresponding to PCT International Application No. PCT/EP2018/078021 filed Oct. 15, 2018.

*Primary Examiner* — Bryan R Perez

(57) ABSTRACT

A power plant and a method for operating such a power plant having at least one generator, which is cooled by a cooling gas cooled by a generator heat exchanger, and a closed cooling water system, to which the generator heat exchanger and additional heat exchangers of the power plant are connected, wherein the generator heat exchanger is a component of an additional cooling water circuit, which serves solely to cool the generator, which is connected to the cooling water system and can be selectively disconnected therefrom by at least one shut-off valve, and which has a pump and at least one refrigerating machine for cooling the cooling water flowing through the additional cooling water circuit.

22 Claims, 6 Drawing Sheets

(56) References Cited

U.S. PATENT DOCUMENTS

| | | | |
|---|---|---|---|
| 2008/0178590 A1 | 7/2008 | Chillar et al. | |
| 2012/0137713 A1* | 6/2012 | Duraisamy | F25D 29/003 165/200 |
| 2013/0160450 A1* | 6/2013 | Cogswell | F01K 25/08 60/657 |
| 2014/0102481 A1* | 4/2014 | Ramminger | B08B 9/032 134/18 |
| 2014/0216035 A1* | 8/2014 | Bierewirtz | F01K 25/08 60/693 |
| 2015/0059342 A1 | 3/2015 | Kruger et al. | |
| 2015/0145256 A1* | 5/2015 | Omoruyi | F01K 25/08 60/671 |
| 2016/0146516 A1* | 5/2016 | Liu | F25B 15/02 62/483 |

FOREIGN PATENT DOCUMENTS

| | | |
|---|---|---|
| DE | 102015201072 A1 | 7/2016 |
| EP | 1529333 A1 | 5/2005 |
| EP | 2615266 A2 | 7/2013 |
| WO | 2004017494 A1 | 2/2004 |
| WO | 2015188976 A1 | 12/2015 |

* cited by examiner

POWER PLANT HAVING A COOLING SYSTEM, METHOD FOR OPERATING SUCH A POWER PLANT, METHOD FOR MODIFYING A POWER PLANT

CROSS REFERENCE TO RELATED APPLICATIONS

This application is the US National Stage of International Application No. PCT/EP2018/078021 filed 15 Oct. 2018, and claims the benefit thereof. The International Application claims the benefit of German Application No. DE 10 2017 220 977.1 filed 23 Nov. 2017. All of the applications are incorporated by reference herein in their entirety.

FIELD OF INVENTION

The invention relates to a power plant having at least one generator which is cooled by means of a cooling gas which is cooled by a generator heat exchanger and a closed cooling water system, to which the generator heat exchanger and other heat exchangers of the power plant are connected.

BACKGROUND OF INVENTION

Such power plants are known in the prior art as different embodiments. They may be constructed as a gas turbine, steam turbine or as a gas and steam turbine power plant. A large number of power plant components require cooling in order, on the one hand, to discharge the heat loss which occurs and, on the other hand, to increase the power of the power plant.

The generators of a power plant are generally cooled with cooling gas which is cooled by generator heat exchangers. The generator heat exchangers are connected to a closed cooling water system of the power plant, via which other heat exchangers can also be supplied with cooling water, for example, heat exchangers for lubricant and/or sealing oil cooling, for cooling pumps or the like. The recooling of the cooling water of the cooling water circuit can be carried out in different ways, for example, by means of freshwater continuous-flow cooling, recirculation cooling using a cooling tower or air-cooled coolers, etcetera.

The electrical power which it is possible to achieve on the generator is dependent on the cold gas temperature of the cooling gas predetermined to cool the generator windings, that is to say, the cooling gas temperature on entering the generator. The lower the cold gas temperature is, the more mechanical energy can be converted into electrical energy in the generator. The cold gas is obtained as described above via the generator heat exchanger which is cooled via the cooling water system. Consequently, the cold gas temperature of the cooling gas is coupled for generator cooling to the cooling water temperature of the cooling water system. The cooling water temperature is in turn dependent on the recooling and consequently cannot be lowered as desired. Consequently, limits are also set for the electrical power which can be achieved at the generator.

If, as a result of power-increasing measures on the turbine, there is an increase of the mechanical power on the generator shaft, it would be desirable to provide improved cooling for the generator in order to be able to convert this excess power into electrical energy.

EP 1 529 333 A1 discloses a cooling of a generator in which the cooling water of the cooling water system of the power plant is additionally cooled down for the generator cooling.

SUMMARY OF INVENTION

Based on this prior art, an object of the present invention is to provide a power plant of the type mentioned in the introduction with an improved structure.

The object is achieved with a power plant and an operating method and a method for modifying a power plant.

In order to achieve this objective, the present invention provides a power plant of the type mentioned in the introduction, which is characterized in that a generator heat exchanger is a component of an additional cooling water circuit, which serves exclusively to cool at least one generator which in particular is connected to the cooling water system of the power plant and which in particular can be selectively separated therefrom by means of at least one shut-off valve.

Another advantage is the presence of a pump and at least one refrigerating machine for cooling the cooling water which flows through the additional cooling water circuit.

The provision of a separate additional cooling water circuit for the at least one generator which can be decoupled from the cooling water system is advantageous in that via the additional cooling water circuit a cooling power which is adapted to the cooling requirement of the at least one generator can be provided, without consideration of the cooling power of the cooling water system, via which the additional heat exchangers are cooled in order to cool, for example, lubricant and/or sealing oil, pumps or other components of the power plant. Nonetheless, by opening the at least one shut-off valve, a cooling of the generator can also be carried out selectively via the cooling water system alone, if at low ambient temperatures only a low cooling power has to be provided for the generator or the additional cooling water circuit is omitted so that emergency cooling is ensured.

Another advantage is that the additional cooling water circuit is supplied via the cooling water system with cooling water so that no separate cooling water supply is required for the additional cooling water circuit.

The use of at least one refrigerating machine for cooling the cooling water which flows through the additional cooling water circuit provides a high level of flexibility of the cooling power which can be provided so that it is possible to adapt it in a simple manner to changing ambient conditions and operating methods of the power plant.

According to an embodiment of the present invention, the refrigerating machine is a compression refrigerating machine and has an evaporator, a compressor, a condenser and a pressure relief valve which form a closed circuit through which the cooling medium of the refrigerating machine is directed.

The cooling medium of the refrigerating machine is advantageously tetrafluoroethane which can also be obtained under the trade name R134a. Very good results were obtained with tetrafluoroethane as the cooling medium.

The condenser of the refrigerating machine is advantageously cooled with cooling water of the cooling water system, whereby a simple and cost-effective structure of the additional cooling water circuit is achieved.

Alternatively or additionally, the compressor of the refrigerating machine is advantageously cooled with air cooled by a generator heat exchanger which is connected to the cooling water system.

Furthermore, the present invention provides a method for operating a power plant according to the invention described above, in which the additional cooling water circuit during normal operation of the power plant is separated by the at least one shut-off valve from the cooling water system so that the cooling water of the additional cooling water circuit which leaves the generator heat exchanger is recooled exclusively by means of the refrigerating machine. Consequently, the generator cooling is also carried out exclusively via the refrigerating machine and is consequently independent of the cooling water system. Accordingly, an energetically advantageous, very powerful and flexible generator cooling is provided and also enables very high mechanical powers to be converted into electrical energy on the generator shaft.

According to an embodiment of the method according to the invention, when a value falls below a previously defined lower limit value of the mechanical power on the generator shaft of the generator, normal operation is automatically left by opening the shut-off valve and by switching off the additional cooling water circuit so that the generator cooling is no longer carried out via the additional cooling water circuit but instead via the cooling water system and, when the limit value is exceeded again, normal operation is resumed again by closing the shut-off valve and starting up the additional cooling water circuit. The limit value is in this instance selected in such a manner that a correct cooling of the generator can be ensured by the cooling water system alone.

The at least one shut-off valve of the additional cooling water circuit is in the event of a failure of the refrigerating machine advantageously automatically opened and the generator heat exchanger is connected to the cooling water system. In this manner, emergency cooling of the generator via the cooling water system is always ensured.

Preferably, when normal operation is left and when normal operation is resumed, the generator is temporarily cooled both by the additional cooling water circuit and by the cooling water system. As a result of such mixed operation, it is possible to prevent the occurrence within the generator of excessively large temperature gradients which damage the generator.

Other features and advantages of the present invention will become clear with reference to the following description and embodiments of a power plant according to the invention with reference to the appended drawings which schematically illustrate such a power plant.

DETAILED DESCRIPTION OF INVENTION

Figure 1:
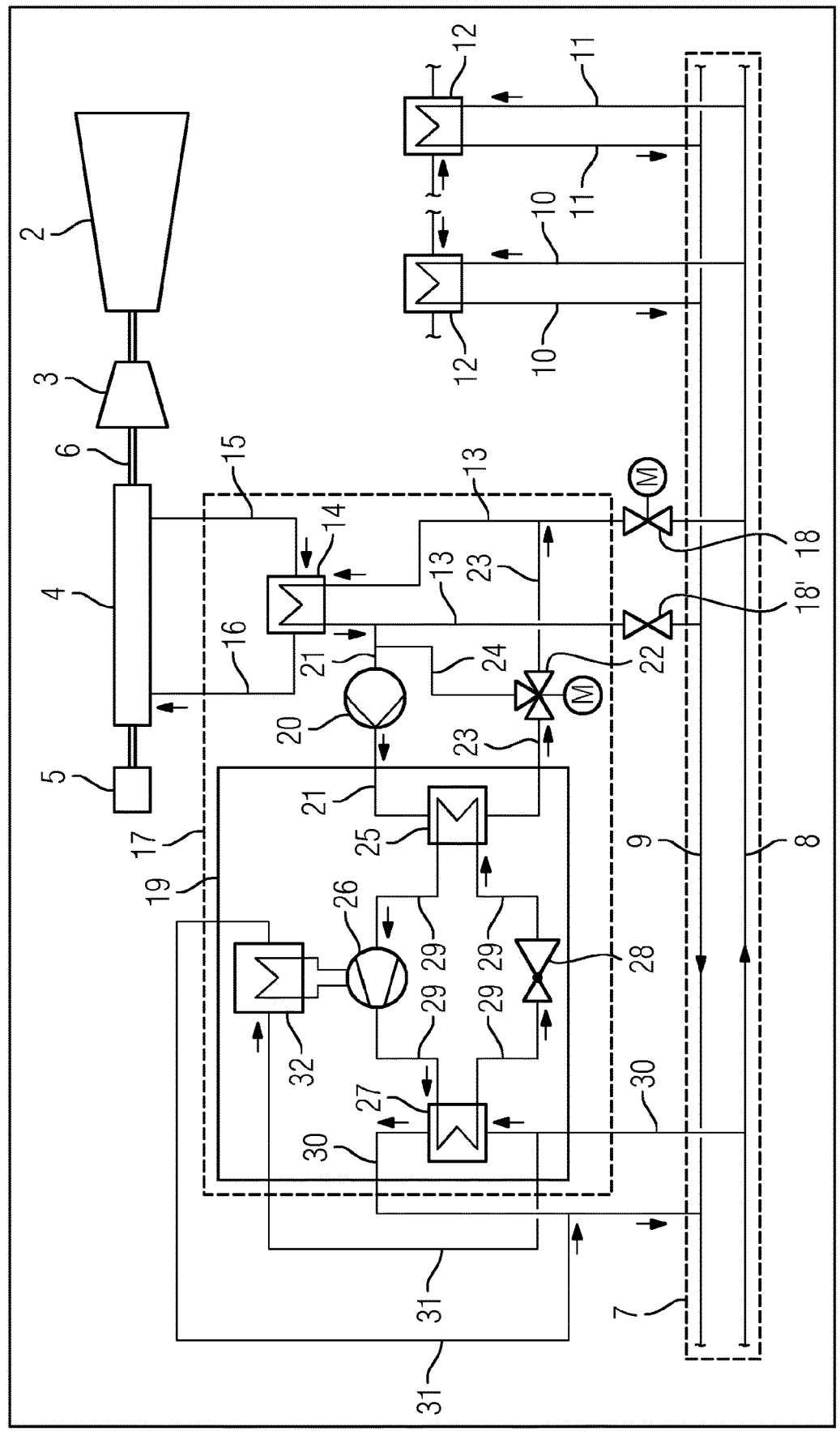
FIG. 1 shows a power plant with a generator, a heat exchanger for a generator having a heat exchanger.

The power plant 1 is in this instance a gas turbine power plant, wherein it could also be any other type of power plant.

Preferably, it may thus also be a gas and steam power plant with at least one steam turbine (not illustrated in greater detail).

The steam turbines may be suspended in the same shaft train of the gas turbine rotor 6.

Preferably, two steam turbines may be part of the power plant.

Therefore, or for other reasons, two generators may be provided.

The power plant 1 advantageously comprises in this instance an air compressor 2, a gas turbine 3, at least one generator 4 and a transformer 5. During operation of the power plant 1, air compressed in the air compressor 2 is burnt in known manner together with a fuel. The combustion gas is supplied to the gas turbine 3 and depressurized therein with a gas turbine rotor 6 being driven. The gas turbine rotor 6 drives the generator 4, which converts the movement energy into electrical energy. The transformer 5 which is electrically connected to the generator 4, transforms the electrical energy in such a manner that it can be supplied to an electrical power supply network.

In order to cool individual components of the power plant 1, it has a closed cooling water system 7 which is generally also referred to as an intermediate cooling water circuit and of which in this instance only a main supply line 8 and a main return line 9 are illustrated. There are connected to the cooling water system 7 via lines 10 and 11 heat exchangers 12 via which, for example, lubricant oil, sealing oil, pumps and/or other components of the power plant 1 are cooled.

In order to cool the at least one generator 4, there is further connected to the cooling water system 7 via lines 13 a generator heat exchanger 14, to which warm gas which is removed from the generator 4 is supplied via the line 15 and is then returned in a cooled state as cooled gas via the line 16 to the generator 4. The generator heat exchanger 14 forms according to the invention a component of an additional cooling water circuit 17 which serves exclusively to cool the generator 4 and in this instance are selectively connected via shut-off valves 18, 18' which are provided in the supplying lines 13 to the cooling water system 7 and can be separated therefrom. The additional cooling circuit 17 comprises a refrigerating machine 19 which is connected via a line 21 which is provided with a pump 20 between the generator heat exchanger 14 and the shut-off valve 18 to the returning line 13 and via a line 23 which has a three-way valve 22 between the generator heat exchanger 14 and the shut-off valve 18 to the supplying line 13, on the one hand, and via a line 24 to the line 21, on the other hand. The refrigerating machine 19 comprises in this instance an evaporator 25, a compressor 26, a condenser 27 and a pressure relief valve 28 through which the cooling medium of the refrigerating machine 19 is directed via lines 29 in the closed circuit, the cooling medium in this instance being tetrafluoroethane (R-134a), wherein in principle other cooling media can also be used. The condenser 27 of the refrigerating machine 19 is cooled with cooling water of the cooling water system 7 which is supplied via lines 30. Furthermore, the compressor 26 of the refrigerating machine 19 is cooled with air cooled by a heat exchanger 32 which is connected to the cooling water system 7 via lines 31 and the lines 30.

During normal operation, the at least one valve 18, 18' is closed and the three-way valve 22 connects the lines 13 and 23 so that the additional cooling water circuit 17 is completely separated from the cooling water system 7. Accordingly, the cooling of the generator 4 is carried out exclusively via the refrigerating machine 19. This is advantageous in that the cooling power of the generator cooling can be adjusted completely independently of the cooling water system 7. Accordingly, an energetically favorable, very powerful and flexible generator cooling is provided and enables even very high mechanical powers on the generator shaft to be converted into electrical energy. With lower mechanical powers on the generator shaft, if the cooling power of the cooling water system 7 is then sufficient for the generator 4, the at least one shut-off valve 18, 18' can be opened and the additional cooling water circuit 17 can be switched off so that the generator cooling is no longer carried out via the additional cooling water circuit 17 or the refrigerating machine 19 but instead via the cooling water system 7. The switching from one cooling type to the other can be carried out using a curve which is stored in the corresponding control and which associates with each generator power a desired cooling gas temperature with an associated cooling water temperature at the inlet of the generator heat exchanger 14 and designates limit values regarding which cooling gas temperatures are reached at which temperatures of the cooling water of the cooling water system 7. If such a limit value is exceeded, a switch is automatically made from a cooling of the generator 4 by the cooling water system 7 to cooling by the additional cooling water circuit 17. If the value falls below the limit value, switching back is accordingly carried out. For such control, at least the generator power and the cooling water temperature of the cooling water system 7 can be detected prior to entering the generator heat exchanger 14 by means of a corresponding sensor system. There is further provision for the at least one shut-off valve 18, 18' of the additional cooling water circuit 17 in the event of a failure of the refrigerating machine 19 to automatically be opened and for the generator heat exchanger 14 to be connected to the cooling water system 7 in order to provide emergency cooling of the generator 4.

If the generator cooling is switched from a cooling via the additional cooling water circuit 17 to a cooling via the cooling water system 7, or vice versa, the switching should advantageously be carried out gradually in order not to bring about any excessively powerful temperature gradients which cause damage in the generator 4. To this end, the three-way valve 22 is provided and also enables mixed operation which ensures that a permissible temperature gradient of the cooling water is complied with at the inlet of the generator heat exchanger 14. This may be 1K/minute to mention just one example.

On the whole, the power plant 1 according to the invention is characterized by an effective generator cooling with a simple structure.

Although the invention has been illustrated in greater detail and described by the example embodiment, the invention is not limited by the disclosed examples and other variations can be derived therefrom by the person skilled in the art without departing from the protective scope of the invention. It is thus, for example, also possible to connect to a centrally installed refrigerating machine 19 a plurality of additional cooling water circuits 17 which each have a generator 4. In this manner, it is possible to dispense with the installation of a plurality of refrigerating machines 19, whereby costs can be saved.

Figure 2:
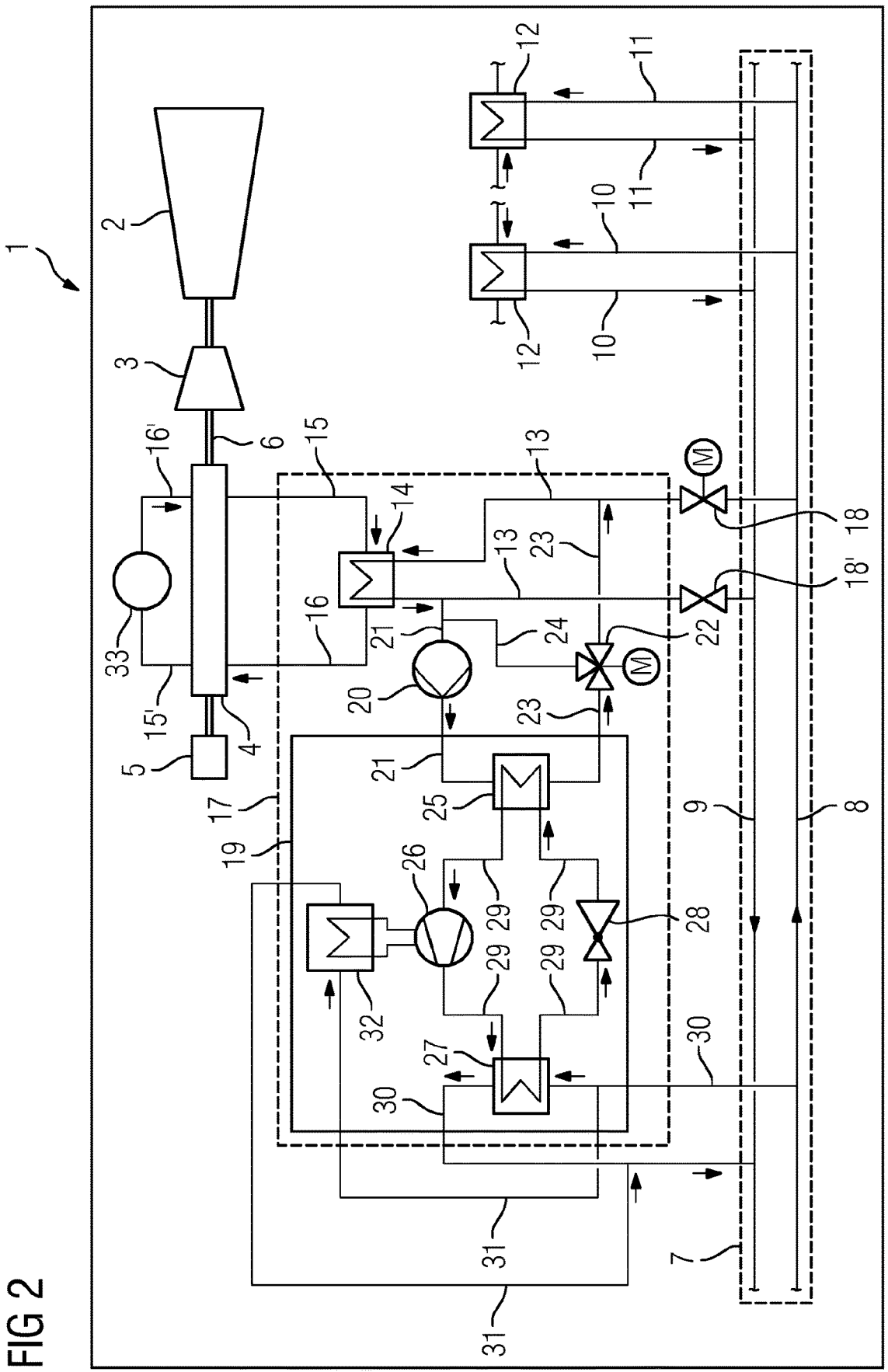
FIG. 2 shows a hybrid system in a power plant, in which a generator can also be cooled by means of a fan.

FIG. 2 shows a hybrid system for cooling the generator 4. The generator 4 may additionally be cooled by a fan or fan system 33 via separate lines 15', 16'. The fan system 33 may be operated parallel with the generator heat exchanger 14 or is advantageously used only with correspondingly lower ambient temperatures or lower thermal loads of the generator 4.

Should the thermal loading of the generator 4 and/or the ambient temperatures increase, the generator heat exchanger 14 has to be operated and the fan system 33 is generally switched off.

Figure 3:
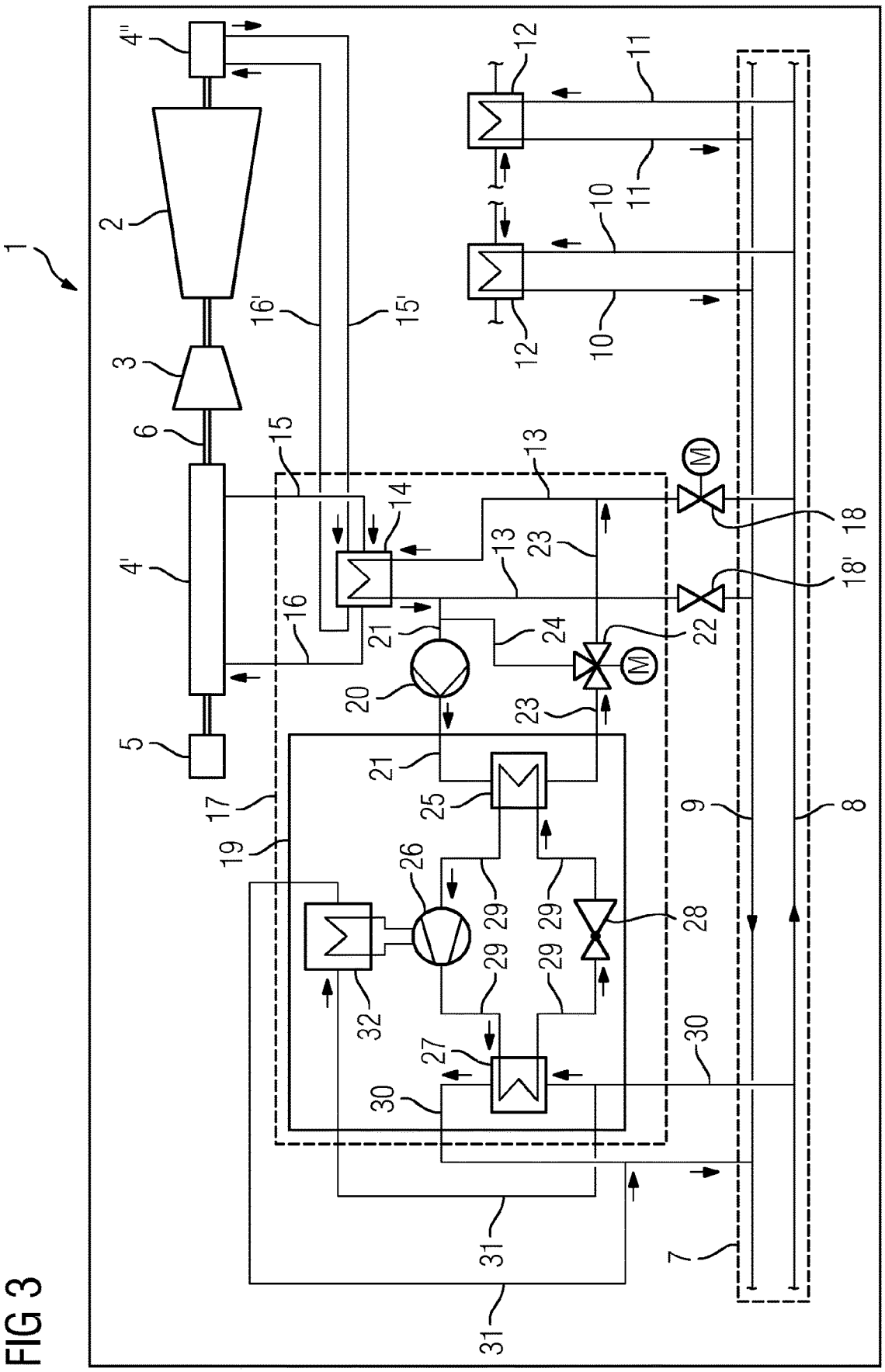
FIG. 3 shows a power plant having two generators and a heat exchanger.

FIG. 3 shows another schematic arrangement of a power plant 1 advantageously with two generators 4', 4". The schematic arrangement of the two generators 4', 4" with respect to one or more gas turbines 3 and/or steam turbines which are not illustrated in greater detail is purely schematic. In any case, with two or even more generators 4', 4", only one generator heat exchanger 14 is present and cools both generators 4', 4". The cooling is advantageously arranged in parallel so that separate circuits 15', 16' are provided for the second generator 4".

Figure 4:
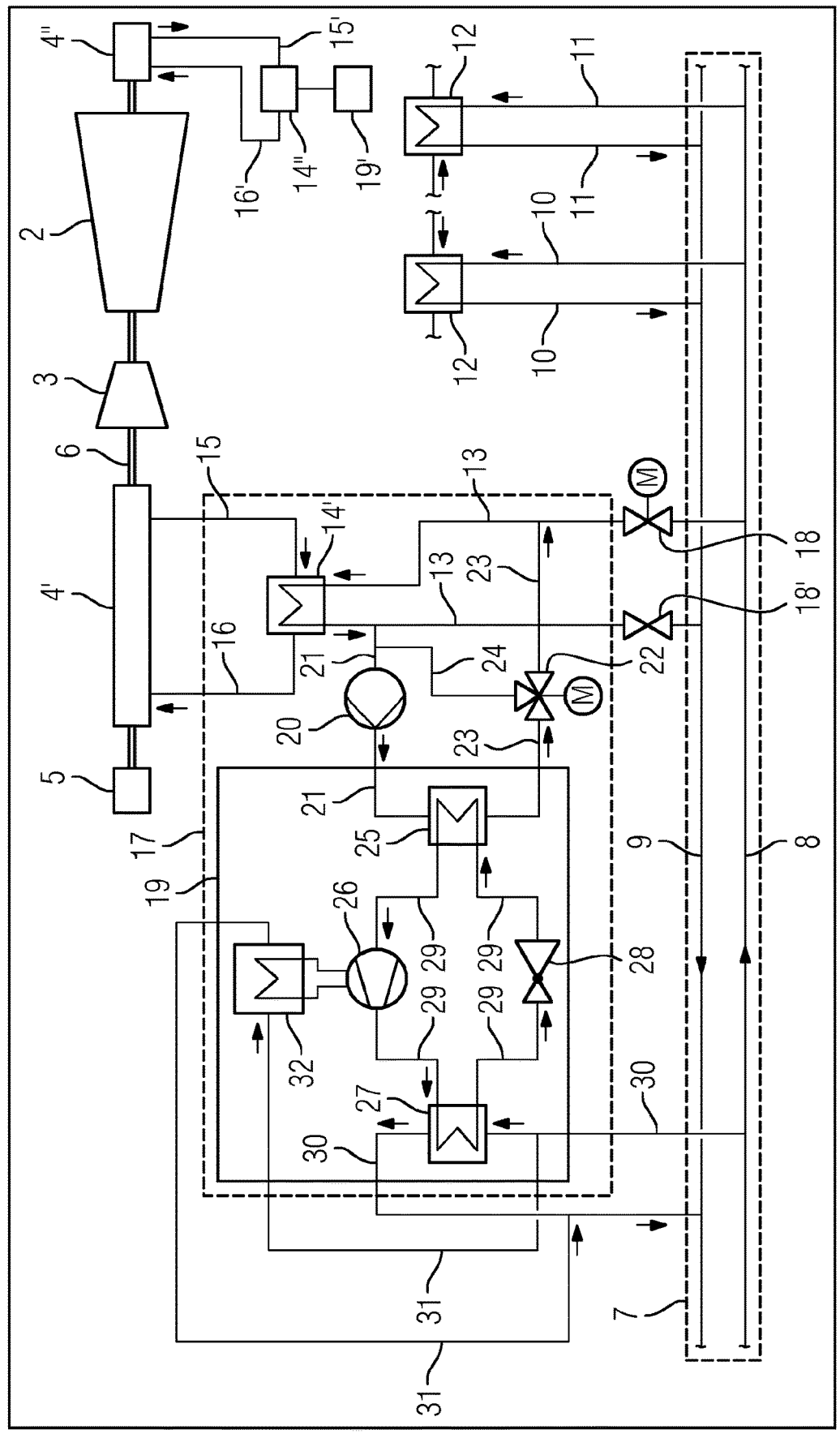
FIG. 4 shows a power plant having two generators, which each have a heat exchanger.

FIG. 4 shows a power plant 1 with two generators 4', 4". The arrangement of the two generators 4', 4" is only schematic, as is the number of gas turbines 3 or the presence of steam turbines which are not illustrated in greater detail.

In any case, the second generator 4" is cooled by means of a second generator heat exchanger 14" which is also in turn connected to a refrigerating machine. This may be the same refrigerating machine 19 or a separate refrigerating machine 19'. Consequently, for each generator 4', 4" there is a separate generator heat exchanger 14', 14" and a separate refrigerating machine 19, 19'. Accordingly, corresponding lines 15' and 16' similar to the lines 15, 16 are also provided for cooling the first generator 4'.

Figure 5:
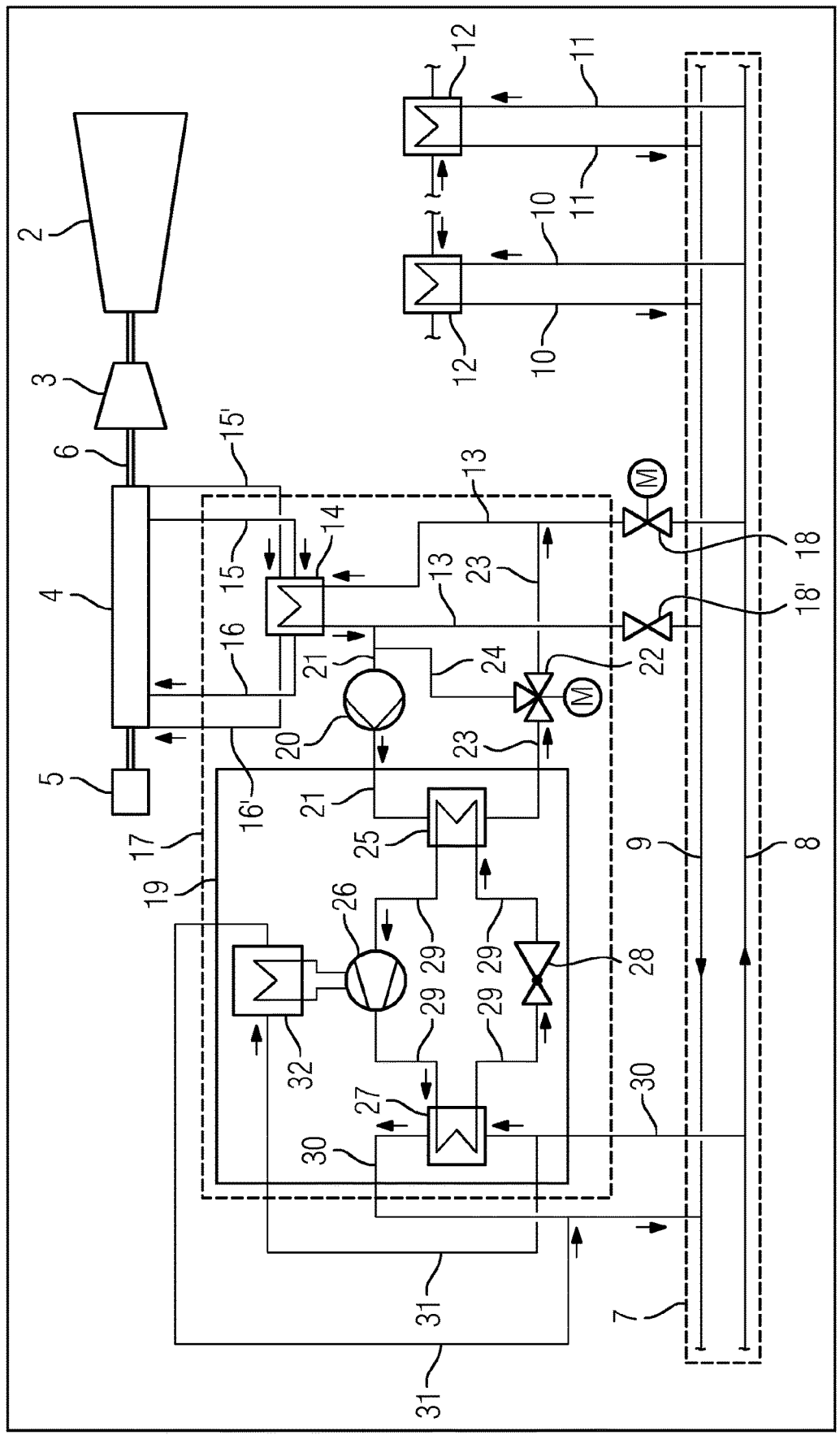
FIG. 5 shows that a heat exchanger is used in order to cool different part-components of a generator.

FIG. 5 illustrates in greater detail that for a generator 4 two supply lines 16, 16' and two drainage lines 15, 15' are provided and are used to cool different part-components of the generator 4. This may, for example, be an oil cooling and/or a cooling of the rotor. This cooling of part-components naturally applies accordingly to the previous and following Figures.

Figure 6:
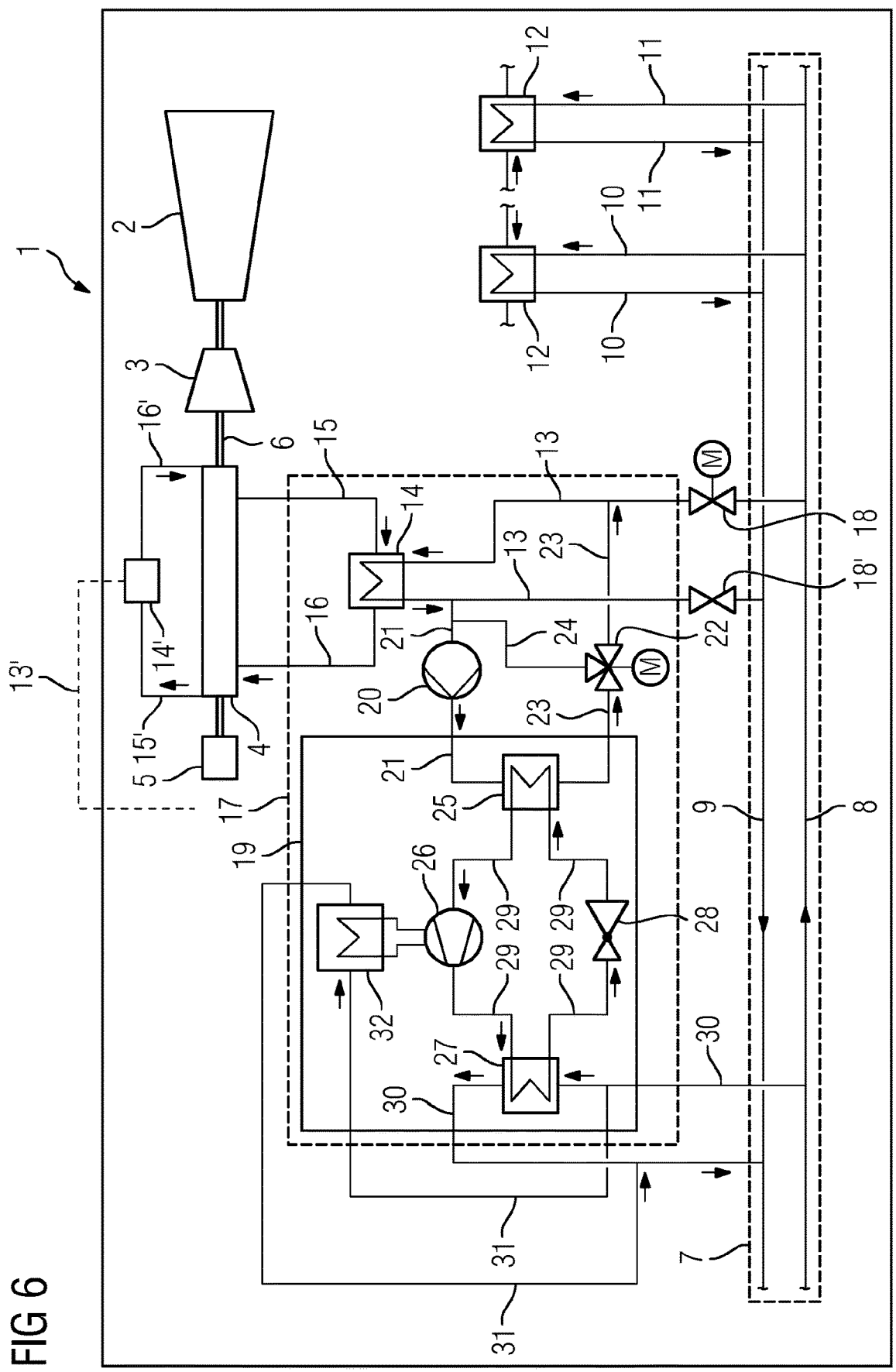
FIG. 6 shows that different part-components of a generator are cooled by means of two heat exchangers.

FIG. 6 shows that for a generator 4 two generator heat exchangers 14, 14' and also additional lines 15', 16' are provided in order to cool another or several part-components of the generator 4. The generator heat exchanger 14 can thus be used to cool the rotor, whereas the second generator heat exchanger 14' is used, for example, to cool the oil in the generator 4.

The use of two generator heat exchangers 14, 14' enables the different part-components of one generator 4 to be cooled in an optimum manner and independently of each other. The second generator heat exchanger 14' is connected by means of corresponding supply lines 13' to the refrigerating machine 19. Optionally, it would also be possible to use a separate refrigerating machine 19 for the second generator heat exchanger 14'.

It is also possible for older existing power plants to be retrofitted, wherein a separate cooling as described above is installed for the generator(s) 4, 4' in addition and for the first time parallel with the cooling water system 7.

The cooling water system 7 is thereby relieved and/or the power of the generator(s) 4, 4' is improved.

The refrigerating machines 19, 19' are advantageously in this instance supplied with the electrical power from the power plant 1.

The other, in particular all the other components of the power plant 1 are advantageously not cooled by the refrigerating machine 19, but instead only by the cooling water system 7.

The invention claimed is:
1. A power plant comprising:
 a generator comprising a hot gas line and a cooled gas line, a generator heat exchanger connected to the generator via the hot gas line and the cooled gas line, a supply line and a return line are connected to the generator heat exchanger, a first shut-off valve and a second shut-off valve, a cooling water system comprising a main supply line and a main return line, the main supply line is connected to the return line via a second shut-off valve and a main return line connected to the supply line via a second shut-off valve, an additional water cooling circuit comprising a refrigerating machine, a hot water line, and a cooled water line, the refrigerating machine is connected to the generator heat exchanger by the hot water line and the cooled water line, and the hot water line is connected to the supply line and the cooled water line is connected to the return line, and wherein when the first and second shut-off valves are closed, only the additional water cooling circuit is operatively connected to the generator heat exchanger.

2. The power plant as claimed in claim 1, further comprising: at least one steam turbine, or only one steam turbine, or only two steam turbines.

3. The power plant as claimed in claim 1, which comprises two generators.

4. The power plant as claimed in claim 1, further comprising: a fan cooling in addition to the generator heat exchanger for the generator in order to cool it with lower thermal loading or at lower ambient temperatures.

5. The power plant as claimed in claim 1, further comprising a further heat exchanger connected to the closed cooling water system.

6. The power plant as claimed in claim 1, wherein the power plant comprises two generators which are cooled by means of the generator heat exchanger by means of separate lines in each case.

7. The power plant as claimed in claim 1, which comprises two generators which are cooled in each case separately by means of generator heat exchangers, or wherein the generator heat exchangers also each have separately associated refrigerating machines.

8. The power plant as claimed in claim 1, wherein the generator or the generators each have part-components, which are cooled separately by means of lines, wherein the lines are cooled for supply of a cooling medium from a generator heat exchanger.

9. The power plant as claimed in claim 1, wherein the generator has part-components, which are cooled by means of separate generator heat exchangers and accordingly separate lines.

10. The method as claimed in claim 1, wherein the power plant has two generators which are each cooled separately by means of generator heat exchangers, or wherein the generator heat exchangers also have separately associated refrigerating machines.

11. The method as claimed in claim 1, wherein the at least one generator has part-components which are cooled separately by means of lines, wherein the lines for supply of a cooling medium are cooled by means of a generator heat exchanger.

12. The method as claimed in claim 1, wherein the generator has part-components which are cooled by means of separate generator heat exchangers and accordingly separate lines.

13. The method for operating a power plant as claimed in claim 1, wherein with a small thermal loading or at a low ambient temperature the generator or generators is/are cooled by means of a fan system and not by means of a refrigerating machine and, when a cooling requirement increases, the fan system is switched off.

14. The method as claimed in claim 1, wherein the power plant has two generators which can be cooled by means of the generator heat exchanger by means of separate lines in each case.

15. The power plant as claimed in claim 1, wherein the refrigerating machine is a compression refrigerating machine and comprises an evaporator, a compressor, a condenser and a pressure relief valve, which form a closed circuit, through which a cooling medium of the refrigerating machine is directable.

16. The power plant as claimed in claim 15, wherein the cooling medium of the refrigerating machine is tetrafluoroethane.

17. The power plant as claimed in claim 15, wherein the condenser of the refrigerating machine is cooled with cooling water of the cooling water system.

18. The power plant as claimed in claim 15, wherein the compressor of the refrigerating machine is cooled with air cooled by a heat exchanger which is connected to the cooling water system.

19. A method for operating a power plant comprising:
cooling at least one generator by means of one generator heat exchanger which is exclusively a component of an additional cooling water circuit,
wherein the additional cooling water circuit during normal operation of the power plant is separated from a closed cooling water system by means of at least one shut-off valve so that the cooling water of the additional cooling water circuit which leaves the one generator heat exchanger is recooled exclusively via a refrigerating machine,
wherein, when a value falls below a previously defined lower limit value of mechanical power on a generator shaft of the generator, normal operation is automatically left by opening the at least one shut-off valve and by switching off the additional cooling water circuit so that the generator cooling is no longer carried out via the additional cooling water circuit but instead via the closed cooling water system that is connected to the one generator heat exchanger, and wherein, when the limit value is exceeded again, normal operation is resumed again by closing the at least one shut-off valve and starting up the additional cooling water circuit.

20. The method as claimed in claim 19, wherein, when normal operation is left and when normal operation of the at least one generator is resumed, it is temporarily cooled both by the additional cooling water circuit and by the closed cooling water system.

21. The method as claimed in claim 19, wherein a compressor of a refrigerating machine is cooled by means of air cooled by a heat exchanger which is connected to the closed cooling water system.

22. A method for operating a power plant, the method comprising:
cooling the at least one generator by means of one generator heat exchanger which is exclusively a component of an additional cooling water circuit,
wherein the additional cooling water circuit during normal operation of the power plant is separated from the closed cooling water system by means of at least one shut-off valve so that the cooling water of the additional cooling water circuit which leaves the one generator heat exchanger is recooled exclusively via a refrigerating machine, wherein the at least one shut-off valve of the additional cooling water circuit is in the event of a failure of the refrigerating machine automatically opened and the one generator heat exchanger is connected to the closed cooling water system.

\* \* \* \* \*